United States Patent
Bell et al.

(10) Patent No.: US 11,827,070 B2
(45) Date of Patent: Nov. 28, 2023

(54) VEHICLE BALL JOINT ADJUSTABLE MOUNTING APPARATUS

(71) Applicant: Maverick Undercar Performance, Inc., Antioch, IL (US)

(72) Inventors: Timothy Bell, Antioch, IL (US); Steve Strasburg, Mooresville, NC (US)

(73) Assignee: Maverick Undercar Performance, Inc., Antioch, IL (US)

( * ) Notice: Subject to any disclaimer, the term of this patent is extended or adjusted under 35 U.S.C. 154(b) by 16 days.

(21) Appl. No.: 17/566,163

(22) Filed: Dec. 30, 2021

(65) Prior Publication Data

US 2022/0203789 A1    Jun. 30, 2022

Related U.S. Application Data

(60) Provisional application No. 63/133,077, filed on Dec. 31, 2020.

(51) Int. Cl.
*B60G 7/00*    (2006.01)

(52) U.S. Cl.
CPC ............. *B60G 7/005* (2013.01); *B60G 7/001* (2013.01); *B60G 2204/41* (2013.01); *B60G 2204/416* (2013.01); *B60G 2204/418* (2013.01); *B60G 2206/012* (2013.01); *B60G 2206/013* (2013.01); *B60G 2206/014* (2013.01); *B60G 2206/12* (2013.01); *B60G 2206/124* (2013.01); *B60G 2206/7101* (2013.01); *B60G 2206/72* (2013.01); *B60G 2206/811* (2013.01); *B60G 2206/81012* (2013.01); *B60G 2206/91* (2013.01)

(58) Field of Classification Search
CPC .. B60G 7/005; B60G 7/001; B60G 2204/416; B60G 2206/12; B60G 2206/124; F16C 11/0695
See application file for complete search history.

(56) References Cited

U.S. PATENT DOCUMENTS

| | | | |
|---|---|---|---|
| 2,900,196 A | 8/1959 | Nienke | |
| 4,162,859 A | 7/1979 | McAfee | |
| 4,244,548 A | 1/1981 | Sharp | |
| 4,662,772 A * | 5/1987 | Schultz | F16C 11/0609 403/114 |
| 4,722,540 A | 2/1988 | Kozyra | |
| 5,346,241 A | 9/1994 | Lee | |
| 5,509,749 A | 4/1996 | Eifert et al. | |
| 5,951,030 A * | 9/1999 | Butler | B62D 17/00 29/401.1 |
| 6,010,272 A * | 1/2000 | Littman | F16C 11/0604 403/138 |

(Continued)

OTHER PUBLICATIONS

Dodge Ram 4 X 4 Adjustable Ball Joint Instructions for combination CAMBER/CASTER adjustment.

(Continued)

*Primary Examiner* — Drew J Brown
*Assistant Examiner* — Tiffany L Webb

(57) ABSTRACT

A mounting apparatus for vehicle suspension ball joints that are firmly affixed for operation, are easily adjustable in a generally vertical direction for precise tuning of suspension geometry for dynamic performance in multiple axes using an array of cylindrical shims tuned to match fastener distance and height with a socket that has mounting bolts that engage a scalloped cap.

11 Claims, 5 Drawing Sheets

(56) References Cited

U.S. PATENT DOCUMENTS

| | | | |
|---|---|---|---|
| 6,505,990 | B1 | 1/2003 | Maughan |
| 6,530,711 | B2 * | 3/2003 | Menotti ............ F16C 11/0671 403/135 |
| 6,783,136 | B2 | 8/2004 | Pronsias Timoney et al. |
| 6,866,441 | B2 | 3/2005 | Yokoyama |
| 7,144,182 | B1 | 12/2006 | Jordan et al. |
| 7,537,225 | B2 * | 5/2009 | Ryshavy ............ B60G 15/068 280/124.147 |
| 7,549,656 | B2 * | 6/2009 | Bier ................ B60G 7/008 280/93.511 |
| 7,712,753 | B2 | 5/2010 | McCann |
| 7,780,178 | B2 * | 8/2010 | Ryshavy ............ B60G 15/068 280/124.147 |
| 7,850,183 | B1 * | 12/2010 | Ryshavy ............ B60G 17/021 280/124.147 |
| 7,857,332 | B2 * | 12/2010 | Hsu ................ B60G 7/005 280/86.757 |
| 8,662,783 | B2 * | 3/2014 | Molenaar ............ F16C 11/0695 403/126 |
| 9,982,711 | B1 * | 5/2018 | Henriksen ........... F16C 11/0642 |
| 10,144,259 | B2 | 12/2018 | North et al. |
| 11,130,378 | B1 * | 9/2021 | Lambert ............ B60G 7/008 |
| 2016/0159392 | A1 | 6/2016 | Hoffmann |

OTHER PUBLICATIONS

Auto Zone advice and how to's; Replace Ball Joints.
Moog Adjustable Ball Joints; online https://www.moogparts.com/parts/suspension/alignment-parts/adjustable . . . .
Sanjay Yadav, et al. "Design and Analysis of Steering Knuckle Component", International Journal of Engineering Research & Technology; vol. 5, Issue 4; Apr. 2016; 7 pages.
S V Dusane et al; "Analysis of Steering Knuckle of All Terrain Vehicles (ATV) Using Finite Element Analysis", 2016 IOP Conf. Ser.: Mater. Sci. Eng. 149; 10 pages.
Your Mechanic: "How to Check Suspension Ball Joints: https://www.yourmechanic.com/article/how-to-check-suspension-ball-joints", 16 pages.
QA1 Racing Ball Joints; https://www.qa1.net/circle-track/rod-ends-ball-joints1/racing-ball-joints1; 3 pages.
Dieter Radaj, et al; "Steering Knuckle Notch Stress approach for assessment of fatigue strength in steam welded joints", Design and Analysis of Fatigue Resistant Welded Structures; 1990; 21 pages.
Geun-Yeon Kim, et al; "Structural Optimization of a Knuckle with Consideration of Stiffness and Durability Requirements", 9 pages; Journal Article; vol. 2014 | Article ID 763692 | https://doi.org/10.1155/2014/763692.
QA1 Ultimate Ball Joint 3 pages.

* cited by examiner

VEHICLE BALL JOINT ADJUSTABLE MOUNTING APPARATUS

CLAIM OF PRIORITY

This application claims priority on Provisional Application Ser. No. 63/133,077, Vehicle Ball Joint Adjustable Mounting Apparatus, filed Dec. 31, 2020, inventors Timothy Bell & Steven Strasburg.

FIELD OF THE INVENTION

The present invention relates to a mounting apparatus for vehicle ball joints and more particularly suspension ball joints that are firmly affixed for operation, but are easily adjustable in a generally vertical direction for precise tuning of suspension geometry.

BACKGROUND

The present invention relates generally to mounting apparatus for interconnecting a vehicle steering knuckle to a vehicle suspension using spacer shims to fine tune the location of the center of the ball in a ball joint vertically. Other adaptations such as with vehicle tie rods or mechanical control cable terminations could advantageously utilize the adjustability to better align imposition of force from a thrust member to a movable assembly.

SUMMARY OF THE INVENTION

Description of Related Art

The prior art for vehicle suspension of independent wheels typically uses a combination of arms or struts interconnected to a steering knuckle which steering knuckle both permits wheel axial rotation around a spindle for vehicle drive and rolling, and wheel assembly rotation about a generally vertical axis for steering or tracking relative to a direction of travel.

Typical arms include wishbone or "A" arms, paired as upper and lower, or struts combining resilient suspension and function analogous to one wishbone or "A" arm. The suspension height is controlled by the spacing of the center of a ball and socket joint—typically known as a ball joint—relative to projecting top and bottom members on the steering knuckle. One prior art feature that is different than that in the Vehicle Ball Joint Adjustable Mounting Apparatus is that pin taper in the prior art is a height controlling factor. The Vehicle Ball Joint Adjustable Mounting Apparatus uses a shoulder, shims, a washer and fastener to control height.

An "A" arm it typical—a terminal portion is at the apex of the "A" and the spaced legs each have ends attached to a frame (or frame equivalent) of a vehicle permitting movement. Typically, a spring between the "A" arms provides resilience such that when the vehicle passes rapidly over a non-smooth road surface, tire contact can be maintained while vehicle inertia carries the vehicle in a relatively straight line. Adaptation to side and acceleration forces is also accommodated, In other suspension arrangements struts can function in some manner as would one of the "A" arms.

The terms strut and arm receive frequently interchangeable usage in the field, but in this application will refer to the vertically movable suspension components, while the steering knuckle top and bottom members that receive the ball assembly of the ball joint will be referred to as projections.

Either a strut or an arm will have a terminal portion coupled to the steering knuckle, which coupling may be advantageously performed by the apparatus of the invention.

A prior art ball joint ball assembly includes a generally spherical ball affixed to a tapered stud the stud contacting and being bolted to a projection. As previously described, the tapered stud, in the prior art, controls height. Different than the prior art is the use of a straight shank, shoulder and threaded stud permitting use of shims more fully described below. More specifically, the stud includes a base portion adjacent the ball, a shank portion, a shoulder mount portion, an extended cylindrical portion and a threaded end that receives a mounting nut. There is a finite distance between the base and distal portion of the end.

Prior art adjustment arrangements have included offset axes to adjust caster and camber such as in U.S. Pat. No. 4,162,859 and in fitting the frustoconical—tapered—portion for vertical adjustment such as in U.S. Pat. No. 10,144,259.

BRIEF DESCRIPTION

The adjustment arrangement includes a plurality of hollow cylindrical spacer shims of selected height. The spacer shims receive the load imparted by torque on the nut. The plurality of spacer shims is arranged so that rearranging the spacers permits mounting the center of the ball at varying distance from the face of the projection, while maintaining the distance between base and distal end. In this way the vertical adjustment of the ball, hence suspension height above the road (or other driving) surface can be changed, while a single ball assembly can be used and consistent torque applied since the material dimensions, hence strength properties, of the base, mount portion and threaded end, is unchanged.

Suspension geometry is far more complex than simply a purely vertical height perpendicularly above a horizontal axis and thus the distance variable using the present apparatus enables far more complex fine tuning of individual wheel suspensions and differential adjustment of the suspension on opposite sides and front and rear of the vehicle for sophisticated arrangement affecting vehicle handling and accordingly speed while maintaining control. This is particularly advantageous for activities like racing where road conditions may vary significantly from week to week, yet maximum performance is required, all while using consistent and standard components like the upper and lower suspension arms. The socket includes an integral collar that receives mounting, or set, bolts that engage a scalloped ring in a cap.

The invention will be better understood and aspects other than those set forth above will become apparent when consideration is given to the following detailed description thereof. Such description makes reference to the annexed drawings discussed below.

DETAILED DESCRIPTION OF THE PREFERRED EMBODIMENT

Figure 1:
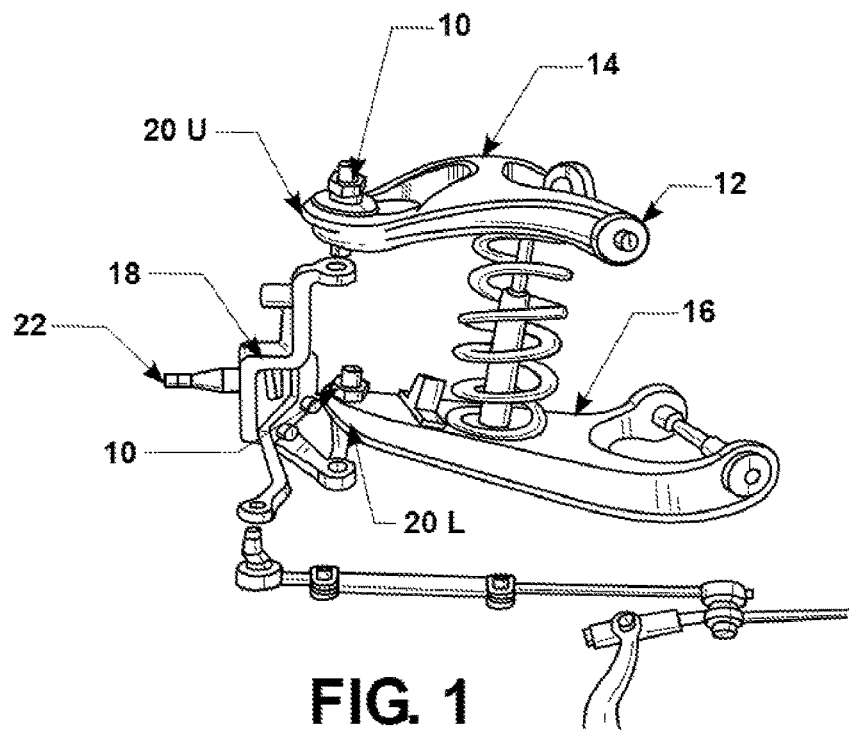
FIG. 1 is a perspective view generally showing the arrangement of adjustable ball joints in a typical suspension arrangement.

The following detailed embodiments presented herein are for illustrative purposes. That is, these detailed embodiments are intended to be exemplary of the present invention for the purposes of providing and aiding a person skilled in the pertinent art to readily understand how to make and use of the present invention. Accordingly, the detailed discussion herein of one or more embodiments is not intended, nor is to be construed, to limit the metes and bounds of the patent protection afforded the present invention, in which the scope of patent protection is intended to be defined by the claims and their equivalents thereof. Therefore, embodiments not specifically addressed herein, such as adaptations, variations, modifications, and equivalent arrangements, should be and are considered to be implicitly disclosed by the illustrative embodiments and claims described herein and therefore fall within the scope of the present invention. Further yet, the drawings are not necessarily to scale and in some instances proportions may have been exaggerated in order to more clearly depict certain features of the invention.

Reference throughout this specification, if any, to "one embodiment" or "an embodiment" means that a particular feature, structure, or characteristic described in connection with the embodiment is included in at least one embodiment of the present invention. Thus, appearances of the phrases "in one embodiment" or "in an embodiment" in this specification do not necessarily all refer to the same embodiment. Furthermore, the particular features, structures, or characteristics may be combined in any suitable manner in one or more embodiments.

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

A ball joint assembly 10 is mounted in a vehicle suspension arrangement 12 with an upper arm 14 and lower arm 16 interconnected with a steering knuckle, or steering member, 18. Specifically ball joint assembly 10 is mounted on a suspension arm projection 20 U or 20 L enabling wheel axial rotation around a spindle 22 for vehicle drive and rolling, and steering knuckle rotation about a generally vertical axis 24 for steering or tracking relative to a direction of travel.

Each ball member engages a socket 28 and each combination ball 26 and socket 28 has a center 30. The suspension height is controlled by the spacing of the center 30 the corresponding projection 20 U and 20 L as arms 14, 16 have finite geometry relative to the vehicle.

The ball member 26 includes a generally spherical ball 32, providing a rotatable end, affixed to a stud 34, the stud contacting and being bolted to a projection 20 U or 20 L. More specifically the stud 34 includes a base portion 36 adjacent the ball 32, a shank portion 38, a shoulder portion 40, providing an abutment, an extended cylindrical portion 42 terminating in a threaded end 44 providing a mounting end that receives a mounting nut 46. There is a finite distance between base 36 and distal portion of the end 44.

Housing or shell 50 is formed and arranged for mounting to projection 20 U or 20 L. In the preferred embodiment, shell 50 receives ball member 26 with stud 34 projecting through aperture 52. An externally threaded cap 54 is adjustably fastened to internally threaded wall 56 of shell 50. Appropriate compression permits the desired movement of ball and socket 10. Externally threaded wall 58 enables attachment to projection 20 U or 20 L. Lock collar 60, integral with shell 50, with mounting or set bolts 62 is used to prevent rotation of cap 54.

The height adjustment arrangement includes a plurality of hollow cylindrical spacer shim assembly 70, specifically shims 72, 74, 76 of selected vertical distance. The design distance D is the sum of the height H of the collected spacer shim assembly 70 plus the thickness of projection 20 U or 20 L plus washer 78 to be fastened with nut 46. Nut 46 may have a castellated portion 80 that may be secured with a clip 82, cotter pin or safety wire.

Figure 2:
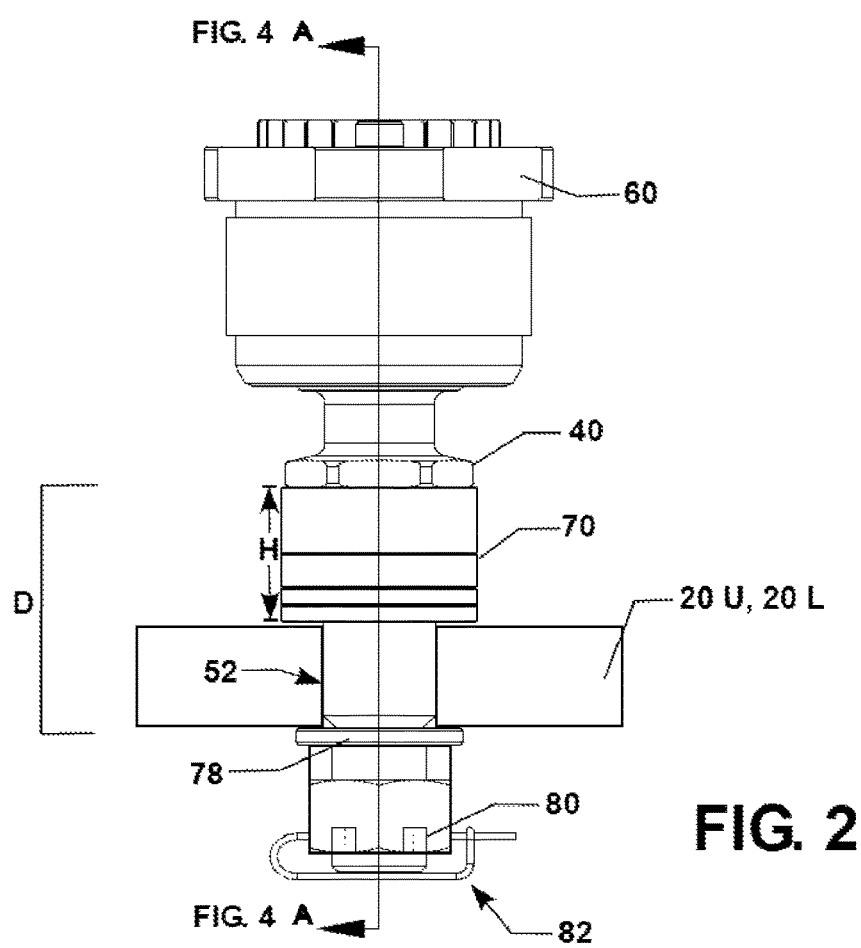
FIG. 2 is a side elevational view of the ball joint of the invention, it being understood that it is generally symmetric.
Figure 3:
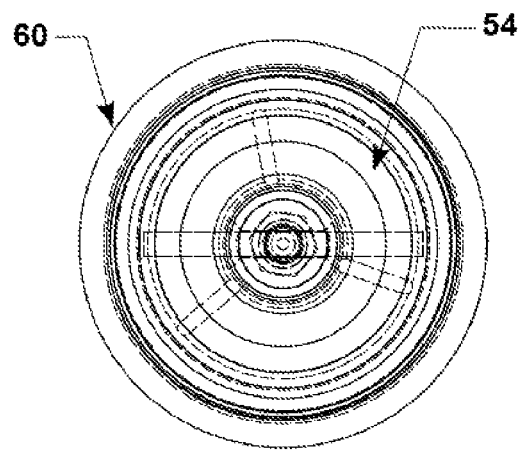
FIG. 3 is a top plan view of the ball joint of the invention without the lock collar in place.
Figure 4:
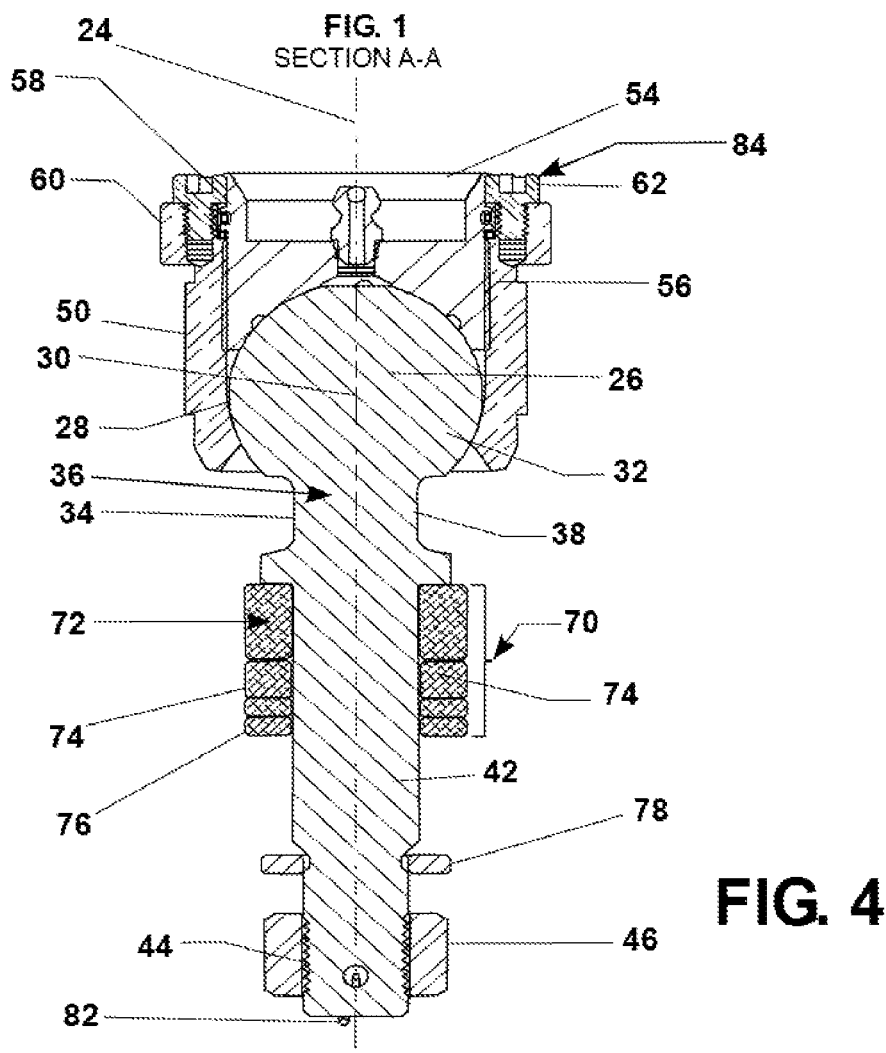
FIG. 4 is a sectional view of the ball joint of the invention, it being understood that it is generally symmetric.
Figure 5:
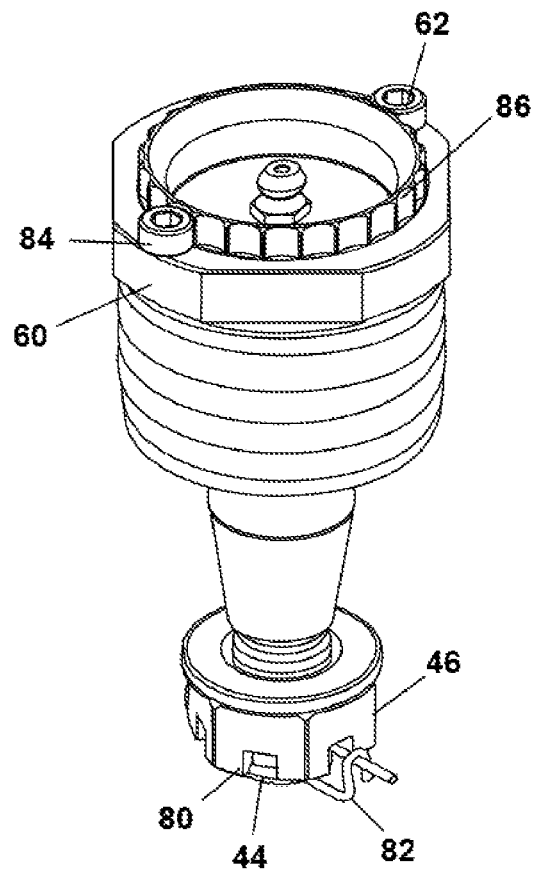
FIG. 5 is a perspective view of the ball joint of the invention.
Figure 6:
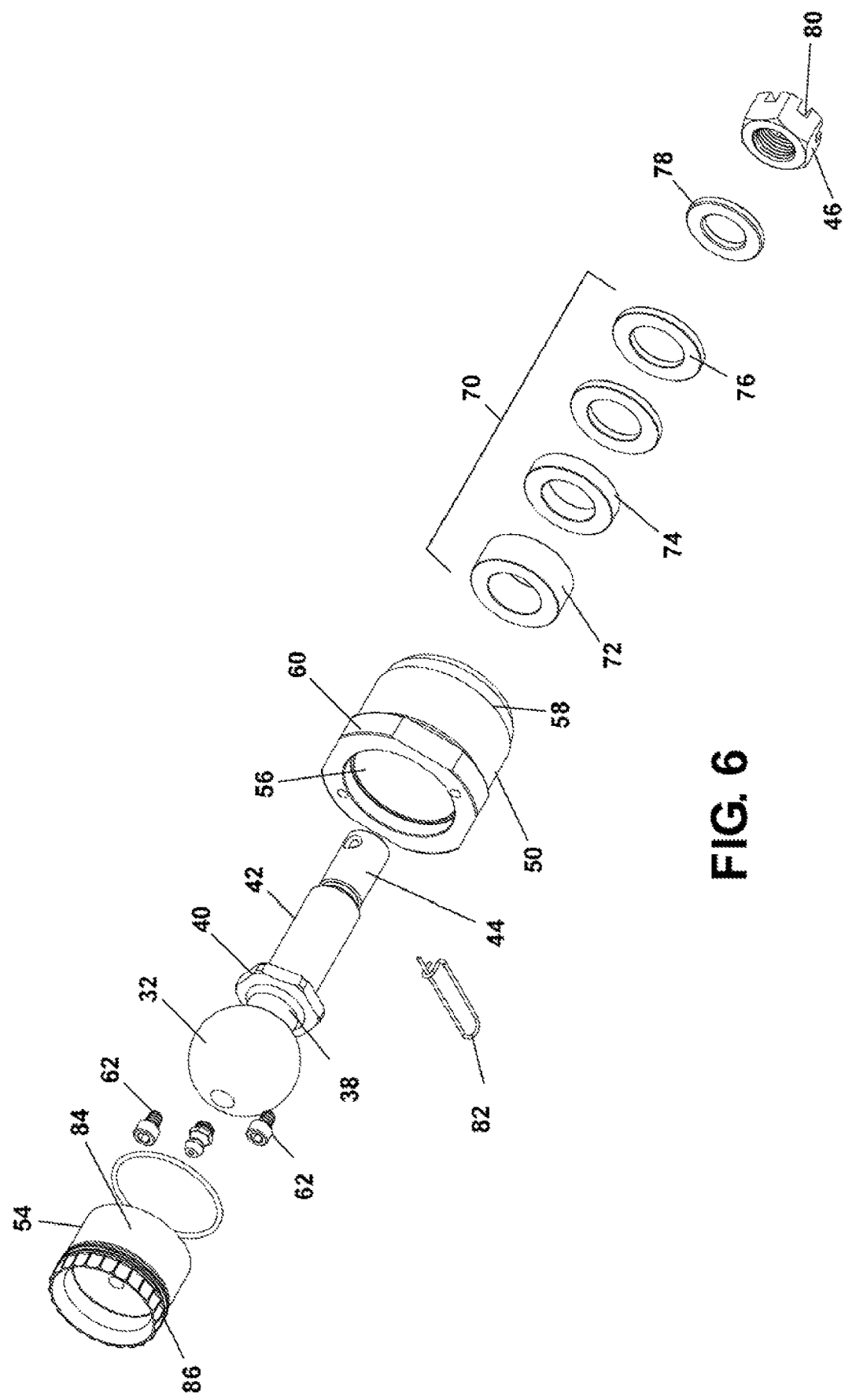
FIG. 6 is an exploded view of the ball joint of the invention.
Figure 7:
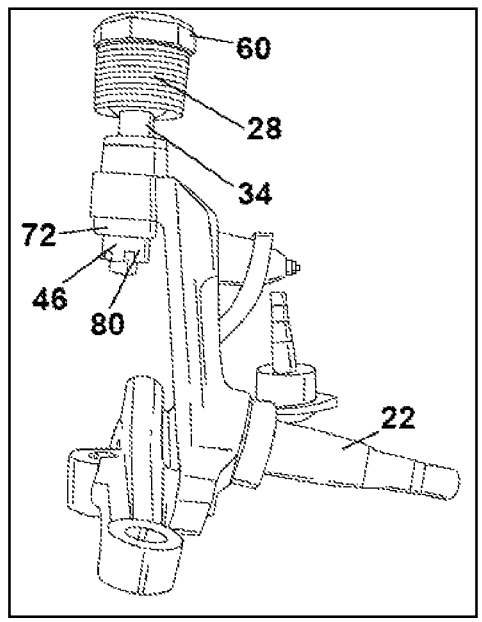
FIG. 7 is a perspective view of the ball joint of the invention mounted on a steering knuckle, outside the suspension arm assembly.
Figure 8:
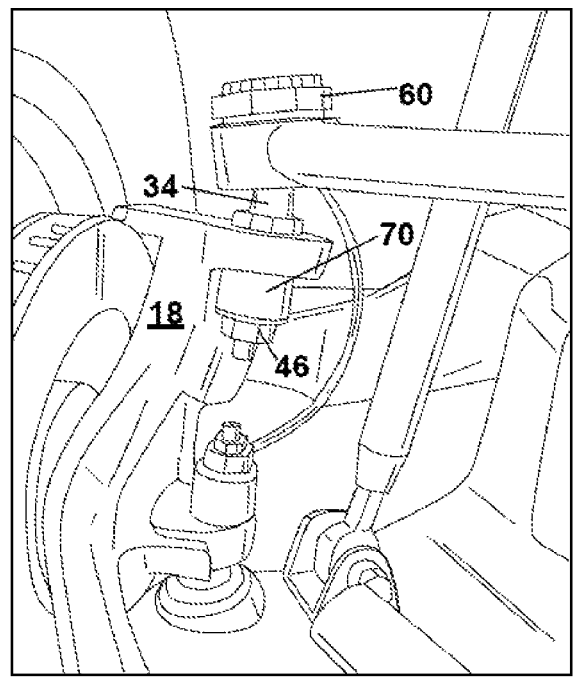
FIG. 8 is a perspective view of the ball joint of the invention a steering knuckle installed on upper and lower suspension arms of a vehicle.

As may be observed from FIG. 4 the relative height of shim 74 is substantially one half the height of shim 72, and the relative height of shim 76 is substantially half the height of shim 74. There are two shim 76 of equal height. With the foregoing observations from FIG. 4 in combination with the illustrations in FIG. 2, therefore, the shim 72 is also one half of height H, and by definition half the height of shim combination 70. Similarly, shim 74 is one quarter of height H and by definition, one quarter the height of shim assembly 70. Similarly, each of shims 76 is one eighth of height H and by definition, one eighth the height of shim assembly 70. There being two shims 76, the entire heights H and 70 are accounted for. It will be understood from the drawings and written description that once given the use of the described shims, as shims, and total distance D, shims will either be placed above or below vehicle suspension arm projection 20 U or 20 L—and preferably both as a set—to essentially, raise or lower the vehicle relative to a road surface. Assembly 70 is described for convenience, but can be broken up by dividing component shims 72, 74 and 76 above and below projection 20 U and 20 L. Thus, in the preferred embodiment shims above and below projection 20 U and 20, plus the thickness of projection 20 U or 20 L plus washer 78 will always equal distance D.

In the preferred embodiment these may comprise spacer shim 72 one half H, spacer shim 74 one quarter H and two spacer shims 76, one eighth H. In terms of actual dimensions in the preferred embodiment, if H is one inch (25.4 mm) then the height of shim 72 would be one half (0.5) inch (12.7 mm), shim 74 one quarter (0.25) inch (6.35 mm) and shims 76 one eighth (0.125) inch (3.175 mm). These values for mathematical conversions are for clarity and not by way of limitation to significant figures of the precision shown.

An alternative embodiment uses the same H and D dimensions but elongates the stud so that the ball 26 is spaced farther from the shoulder. In this manner greater suspension height changes can be accomplished while maintaining consistent function of the attachment arrangement.

The spacer shim assembly 70 receives the load imparted by torque on the mounting nut 46. The plurality of spacer shims 70 is arranged so that rearranging the spacers permits mounting the center of the ball at varying distance from the face of the projection, while maintaining the distance between base and distal end. In this way the vertical adjustment of the ball 26, hence suspension height above the road (or other driving) surface can be changed, while a single ball assembly can be used and consistent torque applied since the material dimensions, hence strength properties, of the base, mount portion and threaded end, is unchanged. As noted, the geometry is more complex and on a vehicle with multiple wheels, different height dimensions can be selected and because alignment of the components is arranged off the strict vertical and horizontal sophisticated adjustment of suspension performance through static positioning about axes and dynamic performance with respect to pitch, yaw, roll, caster and camber can all be selected and adjusted. This is particularly advantageous for activities like racing where road conditions and vehicle dynamics may vary significantly from week to week, yet maximum performance is required, all while using consistent and standard components like the upper and lower suspension arms. Variable heights can permit great control over suspension geometry including not just ride height, but camber and center of gravity under roll when different heights are used, wheel to wheel.

Previously described housing or shell 50 is formed and arranged to receive ball member 26. Positioning and retaining ball member 26 under load and motion is accomplished by fitting externally threaded cap 54 in internally threaded wall 56 of shell 50. Appropriate compression permits the desired load supporting and movement of ball and socket 10. Housing or shell 50 is itself fastened to projection 20 U or 20 L with externally threaded wall 58 fitting corresponding threads in projection 20 U or 20 L. Once cap 54 is threadily tightened to the selected torque setting, mounting bolts 62, preferably comprising internal hex drive bolts 62 with an enlarged cylindrical head 84 are fitted to matingly abut a scalloped ring 86 so that one or more bolt 62 prevent unscrewing of cap 54. For example, 24 scallops will generally permit tightening cap 54 within 15 degree increments, which, because of the external threads of cap 54 will permit relatively precise tension and position adjustment, yet ease of disconnecting through the simple removal of bolts 62.

In an alternative embodiment center 30 can be spaced farther from shoulder 40. The shim height Hc could be formed and arranged for one 15 inch height Hc or by forming shank 38 longer, a two inch height could be set for Hc. The specific dimensions are illustrative. With increased Hc and constant projection thickness, design distance D can be changed.

There have thus been outlined, rather broadly, the more important features of the invention in order that the detailed description thereof that follows may be better understood, and in order that the present contribution of the art may be better appreciated.

Numerous aspects, features and advantages of the present invention will be readily apparent to those of ordinary skill in the art upon reading of the following detailed description of presently preferred, but nonetheless illustrative, embodiments of the present invention when taken in conjunction with the accompany drawings. In this respect, before explaining the current embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

The construction and arrangements, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or other varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention. As to the manner of usage and operation of the present invention, the same should be apparent from the above description. Accordingly, no further discussion relating to the manner of usage and operation will be provided.

While a number of exemplary embodiments have been described in detail, it should be apparent that modifications and variations thereto are possible, all of which fall within the true spirit and scope of the invention. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

In accordance with the invention, we claim:

1. A ball joint assembly is mounted in a vehicle suspension arrangement having a steering knuckle enabling rotation of a vehicle wheel around a spindle, and rotation of the steering knuckle around a vertical axis to turn the vehicle, the suspension arrangement having an upper arm and a lower arm interconnected by said steering knuckle, comprising;

said ball joint assembly has a ball member which rotatably engages a socket;

said combination ball and socket has a center;

said steering knuckle has a projection for interconnection with other components through said combination ball and socket;

said ball member includes a generally spherical ball providing a rotatable end affixed to a stud, said stud being affixable to said steering knuckle projection at a mounting end;

said stud further includes, extending from the ball towards said mounting end, a base portion adjacent the ball, a shank portion, a shoulder portion, an extended cylindrical portion and a threaded end;

said threaded end is adapted to receive a mounting nut;

there is a finite distance between said base and a distal portion of said mounting end;
said ball joint further comprising a housing formed and arranged for mounting to a projection on one of said upper arm or said lower arm;
said housing having a shell formed and arranged to receive said ball member with, said ball extending into a shell, such that said ball member is rotatable within said housing;
said housing further including an externally threaded cap, said cap being adjustably fastened to an internally threaded wall of said shell;
said cap being adjusted with said cap external threads engaging said housing internal threads such that selected compression permits the desired movement of ball and socket as said suspension arrangement and steering knuckle move;
a lock collar is integral with said shell and is adapted to be fixed to resist rotation by set bolts;
said set bolts having cylindrical heads;
said cylindrical heads engaging scalloped recesses in the outer edge of said lock collar said engagement of said cylindrical heads in said recesses accomplishing said resistance of rotation
the spheroid portion of the ball and socket
the height of said center spaced from said steering knuckle projection is selectable through the fitting of a plurality of hollow cylindrical spacer shims in a spacer shim assembly;
said shims are of selected vertical dimension whereby the sum of the height, H, of the collected spacer shim assembly plus the thickness of said projection plus the thickness of a washer fastened with said nut is the design distance D for spacing the center;
said shims being adapted to be placed above, below, or divided above and below said projection such that the geometric center of the spheroid portion of the ball is mountable at varying distances from the face of the projection of one of said upper arm or said lower arm, while maintaining the design distance D.

2. The invention of claim 1, further comprising:
said shim assembly having a first shim with a vertical dimension one half H, a second spacer shim with a vertical dimension one quarter H and two third spacer shims each having a vertical dimension one eighth H.

3. The invention of claim 1, further comprising:
said stud is elongated so that said ball center is spaced farther from the shoulder enabling greater suspension height changes while maintaining consistent function of the coacting combination of shank, shoulder, threaded mounting end, shims, washer and nut comprising an attachment arrangement.

4. An adjustable mounting apparatus for a vehicle suspension and steering joint comprising:
said suspension having upper and lower suspension arrangements movably affixed to a vehicle maintaining a vehicle spaced above a surface;
a steering member interconnecting said arrangements with a first articulating member and second articulating member;
said steering member having at least one mounting projection;
at least one of said articulating members has a rotatable end and a mounting end;
said ends being interconnected by a stud at said mounting end;
said stud being attachable to said mounting projection with a fastener;
said rotatable end being adapted for coupling to a terminal portion of one of said upper or lower suspension arrangements;
said stud having a fixed length defined at one end by an abutment and at a connection end opposite said abutment;
said abutment and connection end being interconnected by a extended cylindrical portion;
a plurality of hollow cylindrical spacer shims of selected height being adapted to fit said cylindrical portion;
said shims being selected and arranged above, below, or divided both above and below said terminal portion so as to adjust and maintain a selected distance between said abutment and said mounting end;
said shims being formed in a plurality of first and second displacements, combinable so that the sum of said first and second displacements multiplied by the number of shims equals said height;
said shims being formed in said plurality of first and second vertical displacements and a third displacement, combinable so that the sum of said first, second and third displacements multiplied by the number of shims equals said height;
said fastener is a castellated nut;
said mounting end is threaded to receive said nut;
said distance between said abutment and said mounting end is maintained by compressing said shims and terminal portion against said abutment by selectively applying torque to said nut;
said torque load is maintained using a clip to limit further rotation of said nut;
said first articulating member has a first rotatable end and a first mounting end;
said first rotatable end and first mounting ends are interconnected by a first stud at said first mounting end, said first stud having a shank interconnecting said first rotatable end and said first mounting end;
said stud being attachable to a first mounting projection with a first fastener;
said first rotatable end is adapted for coupling to a first terminal portion of one of said upper or lower suspension arrangements;
said first stud having a fixed length defined at one end by a first abutment and a first connection end opposite said first abutment;
a first plurality of hollow cylindrical spacer shims of selected height being adapted to fit said first shank;
said shims being selected and arranged above, below, or divided both above and below said first terminal portion so as to adjust and maintain a selected distance between said first abutment and said first mounting end;
said second articulating member has a second rotatable end and a second mounting end;
said second rotatable end and second mounting ends are interconnected by a second stud at said second mounting end, said second stud having a second shank interconnecting said second rotatable end and second first mounting end;
said stud being attachable to a second mounting projection with a second fastener;
said second rotatable end is adapted for coupling to a second terminal portion of the other of said upper or lower suspension arrangements;

said second shank having a fixed length defined at one end by a second abutment and at a second connection end opposite said second abutment;

a second plurality of hollow cylindrical spacer shims of selected height being adapted to fit said second shank;

said shims being selected and arranged above, below, or divided both above and below said second terminal portion so as to adjust and maintain a selected distance between said second abutment and said second mounting end.

5. The mounting apparatus of claim 4, further comprising:

said rotatable end is coupled to said terminal portion with a socket assembly;

said socket assembly comprising a housing with a first internal hemispheric portion, a cap with a second internal hemispheric portion;

said housing being mountable to said terminal portion;

said cap being externally threaded and matingly and adjustably fitting in corresponding internal threads in said housing;

said cap having a scalloped lock ring;

said housing being fitted with spaced lock bolt apertures;

lock bolts having external cylindrical portions adapted to matingly fit said scalloped lock ring to resist rotation of said cap.

6. An articulating coupling member comprising:

a first movable component subject to movement forces and having a first component terminal portion;

a second moveable component coupled to said first component by said articulating coupling member and having a second component terminal portion;

said articulating coupling member has a rotatable end and a mounting end;

said rotatable end having a center;

said rotatable end and mounting end are interconnected by a stud extending to said mounting end;

said stud is attachable to said second moveable component at said first terminal portion with a fastener;

said rotatable end being adapted for connecting to said first movable component with a socket arrangement;

said stud having a fixed length defined at one end by an abutment and at a connection end opposite said abutment;

a first plurality of hollow cylindrical spacer shims of selected height being adapted to fit said stud;

said first plurality of shims being selected and arranged above, below, or divided both above and below said second component so as to adjust and maintain a selected distance between said abutment and said mounting end;

said articulated coupling member being a first articulated coupling member;

said rotatable end being a first rotatable end and said mounting end being a first mounting end;

said interconnecting stud being a first stud;

said fastener being a first fastener;

said rotatable end being a first rotatable end and said socket arrangement being a first socket arrangement;

said stud being a first stud, said abutment being a first abutment and said connection end being a first connection end;

said plurality of spacer shims being a first plurality of spacer shims;

said selected distance being a first selected distance;

a second articulating coupling member having a second rotatable end and a second mounting end;

said second rotatable end having a second center;

said second rotatable end and said second mounting end are interconnected by a second stud extending to a second mounting end;

said second stud is attachable to said second moveable component with a second fastener;

said rotatable end being adapted for connecting to said third movable component with a socket arrangement;

said second stud having a second fixed length defined at one end by a second abutment and at a second connection end opposite said second abutment;

a second plurality of hollow cylindrical spacer shims of second selected height being adapted to fit said second stud;

said shims in said second plurality of shims being selected and arranged above, below, or divided both above and below said second component so as to adjust and maintain a second selected distance between said abutment and said mounting end.

7. The coupling member of claim 6, further comprising:

said rotatable end is coupled to said first terminal portion with a socket assembly;

said socket assembly comprising a housing with a first internal hemispheric portion, a cap with a second internal hemispheric portion;

said housing being mountable to said first terminal portion;

said cap being externally threaded and matingly and adjustably fitting in corresponding internal threads in said housing;

said cap having a scalloped lock ring;

said housing being fitted with spaced lock bolt apertures;

lock bolts having external cylindrical portions adapted to matingly fit said scalloped lock ring to resist rotation of said cap.

8. The articulating coupling member of claim 6, further comprising:

said second rotatable end is coupled to said third terminal portion with a second socket assembly;

said second socket assembly comprising a second housing with third internal hemispheric portion, a second cap with fourth internal hemispheric portion;

said second housing being mountable to said third terminal portion;

said second cap being externally threaded and matingly and adjustably fitting in corresponding internal threads in said second housing;

said second cap having a second scalloped lock ring;

said second housing being fitted with spaced lock bolt apertures;

said lock bolts having external cylindrical portions adapted to matingly fit said second scalloped lock ring to resist rotation of said second cap.

9. The articulating coupling member of claim 8, further comprising:

said first selected distance and said second selected distance are the same.

10. The articulating coupling member of claim 8, further comprising:

said first selected distance and said second selected distance are different.

11. An articulating coupling member mechanically connecting first and second components for movement using a ball and socket joint, said first component having a first terminal portion and said second component having a second terminal portion:

said ball and socket joint having a socket connecting to one of said first component or second component;

said socket comprising a housing with a first internal hemispheric portion and a cap with a second internal hemispheric portion;

said housing being mountable to said first terminal portion;

said cap being externally threaded and matingly and adjustably fitting in corresponding internal threads in said housing;

said cap having a scalloped lock ring;

said housing being fitted with spaced lock bolt apertures;

lock bolts having external cylindrical portions adapted to matingly fit said scalloped lock ring to resist rotation of said cap.

\* \* \* \* \*